United States Patent [19]
Murphy

[11] Patent Number: 6,038,031
[45] Date of Patent: Mar. 14, 2000

[54] 3D GRAPHICS OBJECT COPYING WITH REDUCED EDGE ARTIFACTS

[75] Inventor: Nicholas J. N. Murphy, Guildford, United Kingdom

[73] Assignee: 3Dlabs, Ltd, Hamilton HM11, Bermuda

[21] Appl. No.: 08/901,799

[22] Filed: Jul. 28, 1997

[51] Int. Cl.[7] ...................................................... H04N 1/40
[52] U.S. Cl. .................. 358/1.09; 382/109; 382/141; 382/264; 382/269; 382/154; 382/285; 358/448; 345/136; 345/137; 345/138; 345/429; 345/431; 345/432
[58] Field of Search .................................... 382/264, 269, 382/154, 260, 285; 395/141, 109; 358/448; 345/136–138, 429, 431–432

[56] References Cited

U.S. PATENT DOCUMENTS

| | | | |
|---|---|---|---|
| 4,903,141 | 2/1990 | Morton et al. ........................... | 358/448 |
| 5,351,067 | 9/1994 | Lumelsky et al. ....................... | 345/191 |
| 5,526,255 | 6/1996 | Shenk ................................. | 364/167.01 |
| 5,594,854 | 1/1997 | Baldwin et al. ......................... | 395/141 |
| 5,825,936 | 10/1998 | Clarke et al. ........................... | 382/261 |

*Primary Examiner*—Mark R. Powell
*Assistant Examiner*—Lance W. Sealey
*Attorney, Agent, or Firm*—Robert Groover; Matthew Anderson

[57] ABSTRACT

A system and method for performing 3D graphics copying operations in such a manner as to produce both a smooth image and smooth edges. The alpha value of each pixel is used to mark the pixels which are and are not part of the image to be copied, and removes unwanted pixels from bilinear filtering operations. After filtering, the resultant alpha values along the edges of the object are used to eliminate unwanted pixels, and to blend the object into the background of the image, which reduces or eliminates the "blocky" edges.

19 Claims, 5 Drawing Sheets

3D GRAPHICS OBJECT COPYING WITH REDUCED EDGE ARTIFACTS

BACKGROUND AND SUMMARY OF THE INVENTION

This application relates to computer graphics systems, and more specifically to 3D graphics rendering hardware and techniques.

3D Graphics

Three-dimensional graphics (3D graphics) refers to the practice of presenting a scene or image on a two-dimensional screen in such a way that it appears three dimensional. To do so, very much care must be taken to accurately display surface textures, lighting, shadowing, and other characteristics. Displaying a 3D graphics image is much more difficult than displaying a traditional 2D image.

3D Graphics Requirements 3D graphics takes a great deal of computer processing power and memory. One of the performance measures for 3D games is frame rate, expressed in frames-per-second (fps), meaning the number of times each second an image can be redrawn to convey a sense of motion.

3D Graphics Concepts 3D graphics are spatial data represented in polygonal form with an associated set of characteristics, such as light, color, shade, texture, etc. The 3D graphics pipeline consists of two major stages, or subsystems, referred to as geometry and rendering. The geometry stage is responsible for managing all polygon activities and for converting 3D spatial data into pixels. The rendering stage is responsible for managing all memory and pixel activities. It renders data from the geometry stage into the final composition of the 3D image for painting on the CRT screen.

Before consulting how a scene is broken down to allow the computer to reconstruct it, one has to start with a scene which consists of shapes. The modeling process creates this information. Designers use specialized 3D graphics software tools, such as 3D Studio, to build polygonal models destined to be manipulated by computer.

3D Graphics Pipeline

The first stage of the pipeline involves translating the model from its native coordinate space, or model coordinates, to the coordinate space of the application, or world coordinates. At this stage, the separate and perhaps unrelated coordinate systems defining objects in a scene are combined in a single coordinate system referred to as world space (World Space Co-ordinates). Translating objects into world space may involve clipping, or discarding elements of an object that fall outside the viewport or display window.

Interactive 3D graphics seeks to convey an illusion of movement by changing the scene in response to the user's input. The technical term for changing the database of geometry that defines objects in a scene is transformation. The operations involve moving an object in the X, Y, or Z direction, rotating it in relation to the viewer (camera), or scaling it to change the size. (The X coordinate is moving left to right; Y is moving from top to bottom; Z is moving from "in front" to behind.)

When any change in the orientation or position of the camera is desired, every object in a scene must be recalculated relative to the new view. As can be imagined, a fast-paced game needing to maintain a high frame rate will demand a great deal of geometry processing. As scene complexity increases (more polygons) the computational requirements increase as well.

The setup stage is the point in the 3D pipeline where the host CPU typically hands off processing tasks to the hardware accelerator. Setup is the last stage before rasterization, or drawing, and can consume considerable processing time. The computational demands of the setup process depend on the number of parameters required to define each polygon as well as the needs of the pixel drawing engine.

The Rendering Subsystem: Pixel Drawing

While the geometry stages of the 3D pipeline are traditionally left to the host CPU with its powerful computational capabilities, the actual drawing of pixels to the 2D display is called rendering. Rendering is best performed by specialized hardware or the pixel engine, also called the 3D hardware accelerator. At the top of the 3D graphics pipeline, the bottleneck is how fast the calculations can be performed. At the rendering stage the bottleneck is memory access—how fast the pixel reads and writes to the frame buffer (display memory)—and other special purpose memory blocks can be performed. The renderer must be able to process thousands of polygons for each frame which, as mentioned above, must further be updated many times each second in order to sustain an illusion of motion.

Texture Mapping

There are a couple of different ways to add complexity to a 3D scene. Creating more and more detailed models, consisting of a greater number of polygons, is one way to add visual interest to a scene. However, adding polygons necessitates paying the price of having to manipulate more geometry. 3D systems have what is known as a "polygon budget," an approximate number of polygons that can be manipulated without unacceptable performance degradation. In general, fewer polygons yield higher frame rates.

Another important technique that is regularly used to make a scene more appealing is called texture mapping. A texture map is a pattern or picture that is applied to the surface of an object, just like wallpaper is stuck to a wall. Motion video can even be used as a texture map in multimedia 3D. Texture mapping is very important because satisfying environments can be created with few polygons when those polygons are nicely decorated.

Awkward side-effects of texture mapping occur unless the renderer can apply texture maps with correct perspective. Perspective-corrected texture mapping involves an algorithm that translates texels, or pixels from the bitmap texture image, into display pixels in accordance with the spatial orientation of the surface. An efficient 3D system needs to dedicate memory to the storage of texture maps, or bitmaps to be used as textures.

Bilinear Filtering

Texture mapping is used so prevalently that several additional techniques to enhance its effect are often built into a renderer. Bilinear filtering improves the appearance of texture mapping surfaces by considering the values of four adjacent texels in order to determine the value of the displayed pixel. When drawing a given pixel on the edge of an object, for example, the bilinear filtering process will conventionally use the weighted average of each of the RGB values of the four neighboring pixels to compute the value for the given pixel. Therefore, instead of a left-to-right sequence of pixels at the edge of an object which progress as red, red, white, for example, the sequence might filter to be red, pink (half red, half white), white. In this case, the edge of the object would have passed through the center of the second pixel. The pixel is the smallest color unit, and it cannot actually be red on the left half and white on the right half, so pink is used instead. When viewed, the eye interprets the object as intended, with a smooth edge passing through the second pixel.

This process serves to give the appearance of much smoother color transitions between pixels. Even when the object to be displayed should show relatively sharp edges in the final image, as it might have in the example above, the bilinear filtering process will give a remarkable improvement in the final image, by allowing the viewer to see what appears to be sub-pixel resolutions when an edge should only cover part of a pixel, and to smooth transitions between texels in a texture map. This is particularly important when a texture is magnified.

Bilinear filtering avoids the 'blockiness' that results from simple point sampling where adjacent display pixel values may be defined by a single texel. Point sampling requires much less memory bandwidth than bilinear filtering and is generally faster, but leaves distracting artifacts at the edges of objects.

Mip Mapping

Mip mapping involves storing multiple copies of texture maps (generally two or three), digitized at different resolutions. When a texture mapped polygon is smaller than the texture image itself, undesirable effects result. Mip mapping can provide a large version of a texture map for use when the object is close to the viewer, and a small version of the texture map for use when the object shrinks from view. Trilinear filtering is frequently employed to smooth out edges of mip mapped polygons and prevent moving objects from displaying a distracting 'sparkle' resulting from mismatched texture intersections.

Alpha Blending

Alpha blending is a technique that controls the transparency of an object, allowing realistic rendering of translucent surfaces such as glass or water. For this purpose, an additional value, called the "alpha value," is included with the Red-Green-Blue color data of each pixel. Thus, the color data is often referred to as the RGBA data. The RGBA data for each pixel therefore includes both all the color data for the pixel as well as an alpha value indicating the transparency or blending factor. Additional atmospheric effects that are found in rendering engines include fogging and depth cuing. Both of these techniques obscure an object as it moves away from the viewer. The fog effect blends the color data for the pixel with the fog color, which is usually white; the degree of blending is related to the distance from the eye of the object being drawn. Similarly, depth cuing blends the pixel color with the depth cue color, usually black, depending on the distance from the eye.

Antialiasing

One common problem, inherent in a raster display system, is that of jagged or "aliased" edges. Aliasing is especially disconcerting at the edges of texture maps. Antialiasing or minimizing the appearance of jagged edges is important to implement in order to avoid this distraction. The effect is accomplished by reducing the contrast between the edge of an object and the color behind it by adjusting pixel values at the edge.

Double Buffering

All of the preceding calculations and rendering steps must occur on hundreds to thousands of polygons for each frame of an interactive program that needs to update the display at a rate of between 15 and 30 times each second. Double buffering gives the system a little breathing room by providing an opportunity to render the next frame of a sequence into off-screen memory. The off-screen memory is then switched to the display, while the memory containing the formerly displayed frame can be cleared and re-painted with the next frame to be displayed and so on. Display systems that lack a double buffer capability may present distracting transitional artifacts to the viewer.

Image Copying and Scaling

One common operation in computer graphics is to copy a rectangular image to the screen, but only draw certain parts of it. For example, a texture image may be stored on an otherwise blank page; when the texture image is desired to be inserted into a display, the blank background page is obviously unneeded. The parts of the source image not to be copied are defined by setting them to a specific color, called the "key" color. During the copy, a test is made for the existence of this key color, and any pixels of this key color are rejected and therefore not copied. This technique allows an image of any shape to be copied onto a background, since the unwanted pixels are automatically excluded. For example, this could be used to show an explosion, where the flames are represented by an image.

As the explosion continues, or as the viewer moves closer to it, its size increases. This effect is produced by scaling the image during the copy. Magnifying the image produces unwanted side effects, however, and the final image may appear blocky and unconvincing. An example of this technique is shown in FIGS. 1A and 1B. In these figures, the gray area represents the desired image, and the black area represents the key color. FIG. 1A shows the original texture, and FIG. 1B shows the same image copied and scaled. Note that the unwanted key color area has been removed cleanly, but the staircase effect on the edge is magnified. When a texture has more than one color on the interior of the object, as is usually the case, the interior of the scaled texture will also be blocky and unattractive, since there will be no smooth transition between blocks of different color.

The normal way to deal with this is to bilinear-filter the image during the copy so that pixels in the source image are blended with their neighbors to remove the blocky effect. As described above, this procedure blends the color of a given pixel with the colors of that pixel's nearest neighbors, to produce a smoother image overall. This works within the valid parts of the image, but leaves extremely blocky edges. FIGS. 1C and 1D show an original texture, and same texture after it has been filtered, copied, and scaled, respectively. Note that in this case, the cut out edge is as blocky as the original example, but in addition the edge pixels have the black (key color) background blended with the correct color, giving a dark border.

There are three primary artifacts, or defects in the resulting image, caused by bilinear filtering and magnification of the image during copy. Each of these defects reduce the quality of the resultant image, but are typically unavoidable in present systems.

Improved 3D Graphics Object Copying System and Method

The first defect is a border effect caused by including some of the key color, which should not be plotted, in the pixels that are valid for plotting. During the bilinear filtering operation, the edge pixels will be colored in part by neighboring pixels which would not otherwise be copied at all. As a result, the edge pixels will spuriously include some of the key color, and will form a border around the plotted object. The resulting image will appear to have a dark or shimmering outline, which is obviously not intended.

The second problem is the accuracy with which the cut-out can be performed. When the source image is filtered, the normal way of deciding whether or not to plot a pixel is to test if any of the contributing pixels is valid, or if any of them are invalid. Since all of the edge pixels will have been blended with a key color neighbor, and the bordering invalid pixels will have been blended with a valid neighboring pixel, both approaches lead to final image that has a different size before filtering as compared to after filtering. The first method makes the final image too big, while the second method makes it too small.

The third problem is that while bilinear filtering may smooth the color transitions within the selected region of the copy, the edge of the cut-out does not get smoothed and remains blocky.

The present application discloses an innovative system and method for performing these copying operations in such a manner as to produce both a smooth image and smooth edges. The alpha value of each pixel is used to mark the pixels which are and are not part of the image to be copied, and removes unwanted pixels from bilinear filtering operations. After filtering, the resultant alpha values along the edges of the object are used to eliminate unwanted pixels, and to blend the object into the background of the image, which reduces or eliminates the "blocky" edges.

A sample texture is shown in FIG. 1E (described below), and the same texture, after being scaled, copied, and processed according to the preferred embodiment, but without a final alpha test applied, is shown in FIG. 1F (described below).

A sample texture is shown in FIG. 1G (described below), and the same texture, after being scaled, copied, and processed according to the preferred embodiment, including a final step eliminating an alpha test rejecting alpha values less than 0.5, is shown in FIG. 1H (described below). This gives a sharp edge to the scaled texture, which is a vast improvement over the appearance of FIG. 1D.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment (by way of example, and not of limitation), in which:

The standard solution to the first problem, relating to the border effect, is to ensure that any pixels that have the invalid color do not contribute to the final filtered color of valid pixels. This is conventionally done by performing the test before filtering rather than after. While this provides a rudimentary solution to the first problem, the other problems are not addressed at all by current devices.

Preferred Method

The presently preferred embodiment provides a solution to all three problems with a technique herein called "alpha mapping."

Figure 4:
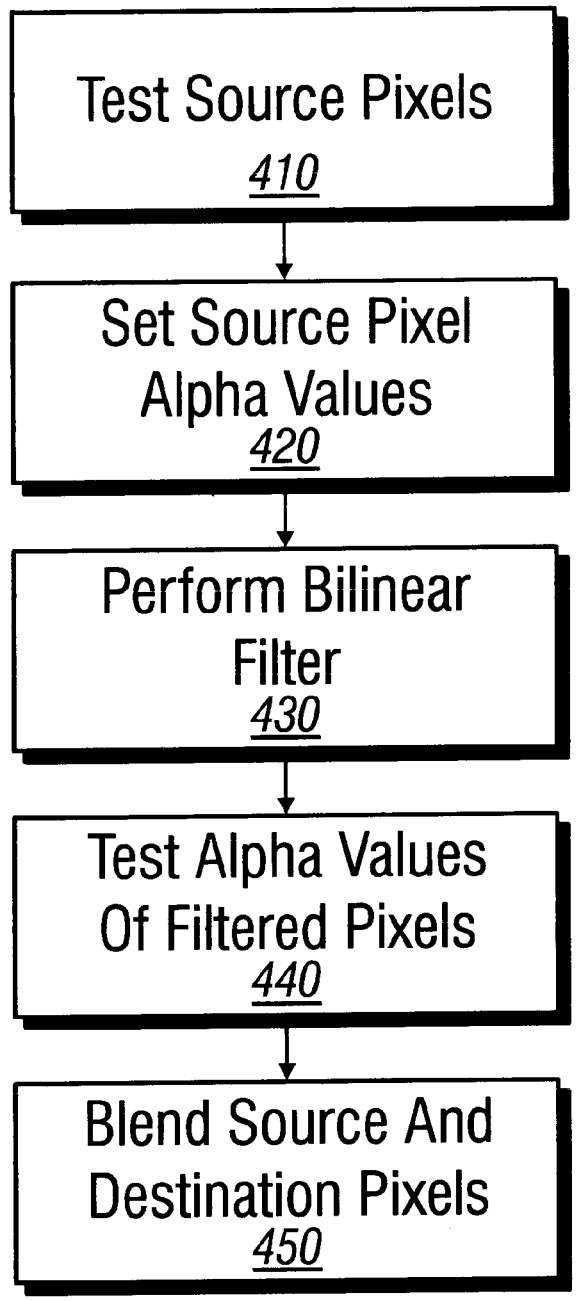
FIG. 4 shows a flowchart of the preferred method.

The primary steps according to the presently preferred method, as shown in FIG. 4, are:

1. Test the color of the source pixels before filtering. (Step 410)

Alpha mapping first performs the same color key test as in conventional systems, but performs this test before any filtering is performed. This is a quick test, in which the color data of each pixel is compared to the key color to determine whether the pixel is or is not part of the object to be displayed.

2. Set the alpha value of the source pixel to zero if it fails the test. (Step 420)

The alpha channel is treated differently than the other color values of the pixel. If a pixel fails the color test, its alpha value is set to zero, otherwise it is left as is, which will usually be equal to one.

3. Perform a bilinear filter on all pixels, blocking the color values of pixels with alpha=0. (Step 430)

The alpha channel of all pixels, whether rejected or accepted, are filtered, but the color values of only the pixels with a positive alpha are used. This results in an alpha value of zero where all contributing pixels are rejected, an alpha value of one where all contributing pixels are accepted, and a varying alpha value where some are rejected and some accepted. As the magnification factor is increased the variable alpha is spread across more destination pixels.

This procedure will eliminate any key color pixels from influencing the final color of the filtered pixels, and forces the edge pixels to have an alpha value proportional to their distance from the body of the object.

4. Test the alpha channel after filtering to reject unwanted pixels. (The range of accepted/rejected alpha values may be varied.) (Step 440)

After filtering, a separate test is performed on the alpha channel which will determine whether or not a pixel is plotted. As a result of the previous operations, each of the pixels on the edge of the object will have alpha values which decrease according to how far out on the edge of the object they are. The threshold at which a pixel is accepted or rejected may be programmed, and by doing this the precise size of the final cut-out may be adjusted. This solves the problem of different cut-out sizes for filtered or non-filtered copies. At the same time, the "sharpness" of the edge of the object can be selected, by choosing a higher or lower cutoff threshold.

5. Blend the source and destination pixels based on the alpha value generated by the filtering. (Step 450)

Following the test, the pixel being copied may be blended with the destination framebuffer using the filtered alpha value. At the edge of the cut-out, where valid and invalid source pixels are adjacent, the alpha values after filtering vary in proportion to the distance from the edge of the cut-out. Using this alpha value to blend the copied pixels with the current values in the framebuffer smooths the transition between the cut-out image and the background, which in turn reduces the blocky edge effects. As the magnification is increased the blend effect may be spread across more pixels to make the transition smoother.

Preferred System Context

The system context of the presently preferred embodiment is a PERMEDIA 2™ 3D rendering chip. The Hardware Reference Manual and Programmer's Reference Manual for this chip describe further details of this sample embodiment, and are both hereby incorporated by reference. Both are available, as of the effective filing date of this application, from 3Dlabs Inc. Ltd., 181 Metro Drive, Suite 520, San Jose, Calif. 95110.

Figure 1A:
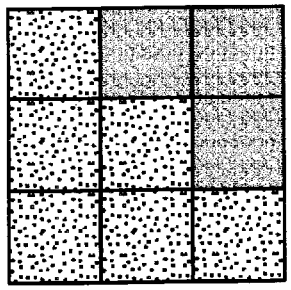
FIGS. 1A–1H show a examples of various texture copying and enlargement techniques.
Figure 1B:
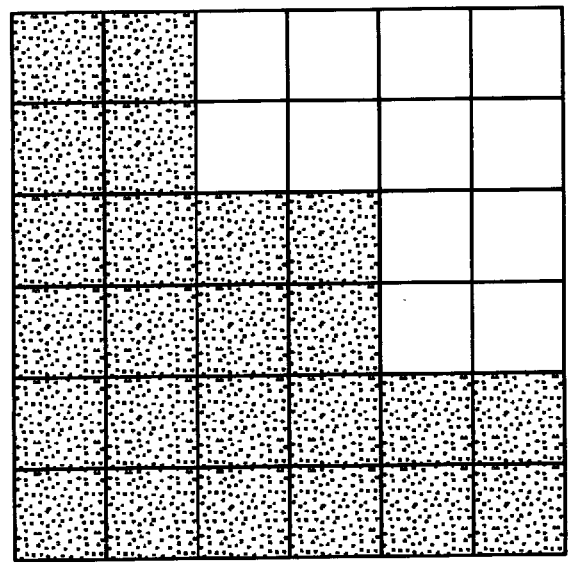
Figure 1C:
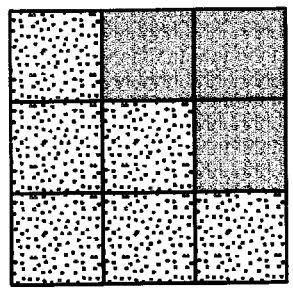
Figure 1D:
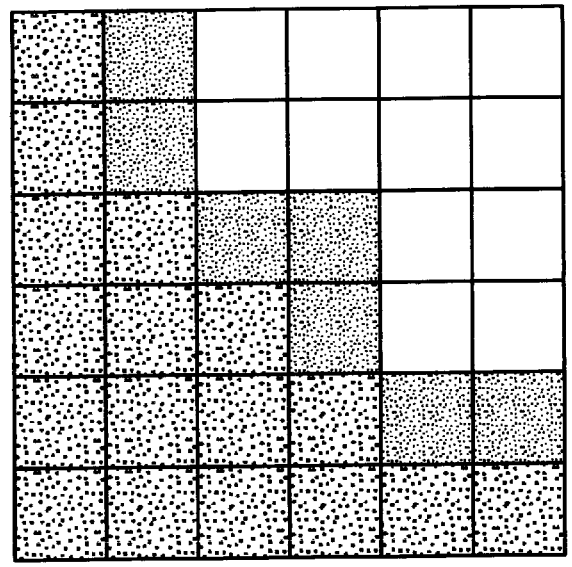
Figure 1E:
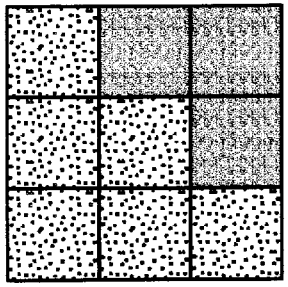
Figure 1F:
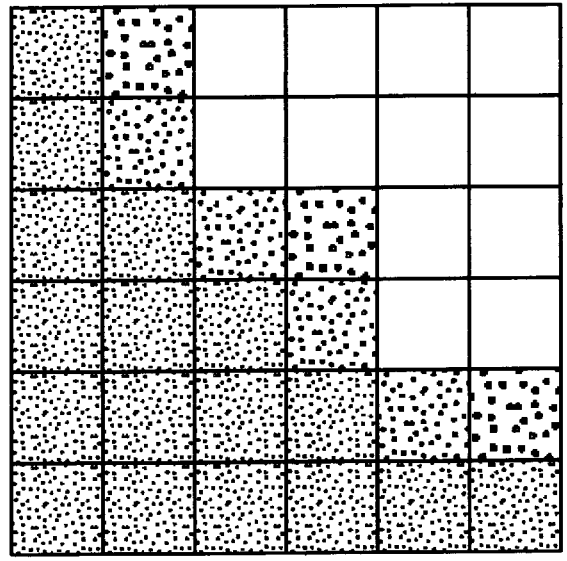
Figure 1G:
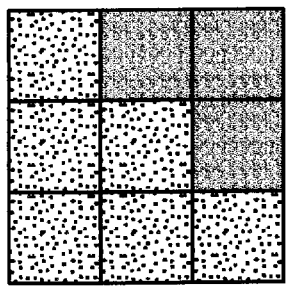
Figure 1H:
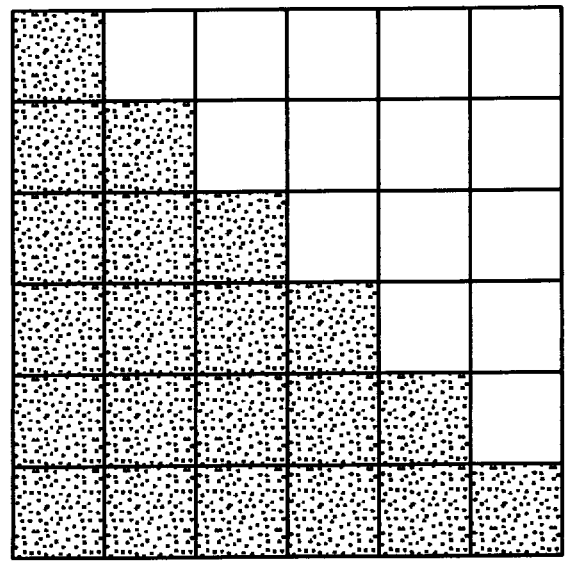
Figure 2:
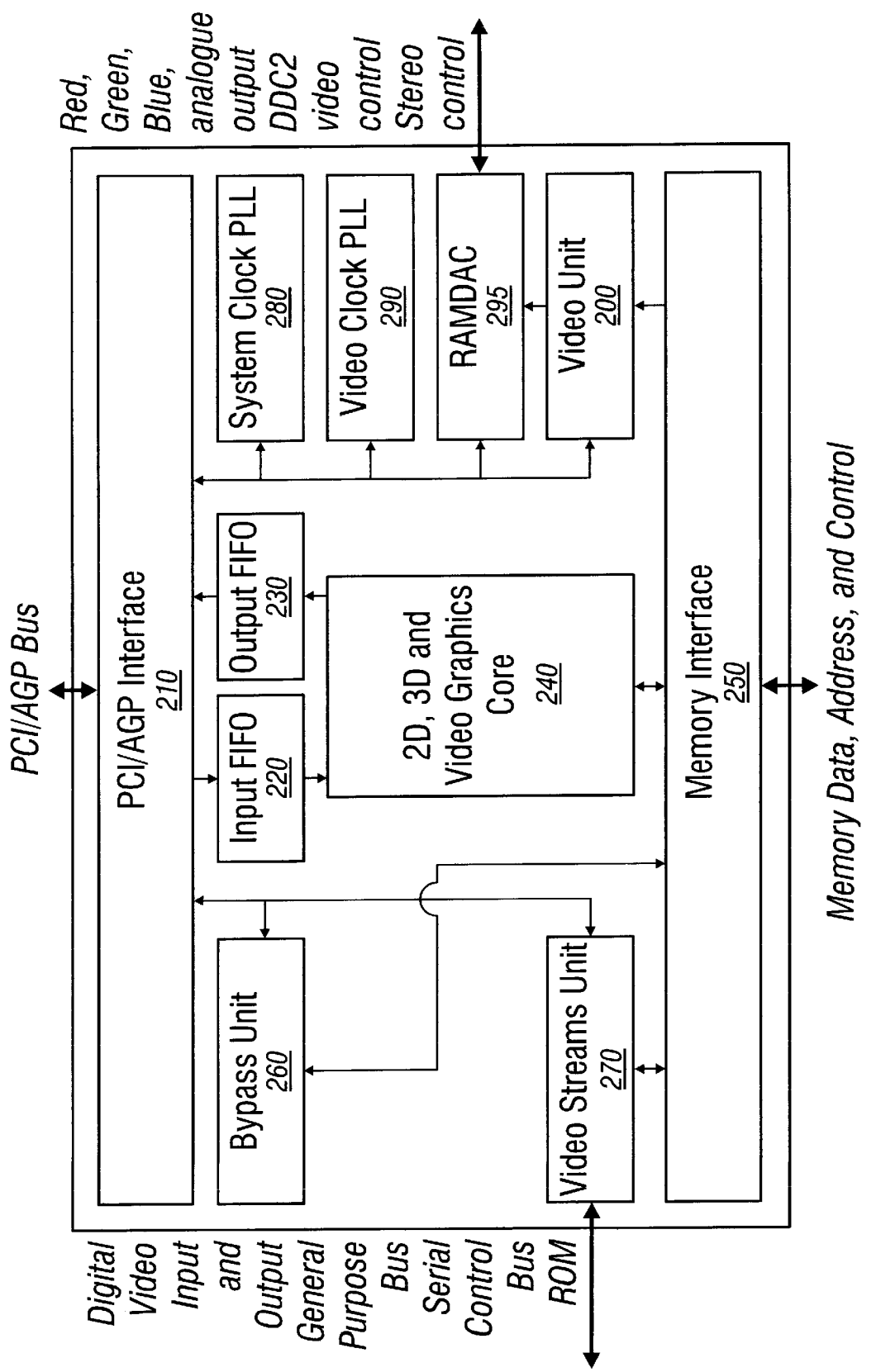
FIG. 2 shows a block diagram of the PERMEDIA 2 preferred system context.

A functional block diagram of the preferred system is shown in FIG. 2. This figure shows the entire PERMEDIA 2 graphics system, which connects to the PCI bus of the host computer system via the PCI/AGP Interface 210. The 2D, 3D, and Video Graphics Core block 240 contains the entire graphics pipeline, and performs all the claimed functions. The input to and output from the Graphics Core is buffered by the Input 220 and Output 230 FIFOs connected between the Core and the PCI interface. A Memory Interface 250 connects the Graphics Core to the system memory, and a Bypass Unit 260 is provided to allow data to bass between units without being processed by the Graphics Core. Also connected between the PCI interface and the Memory Interface are a System Clock 280, a Video Clock 290, a RAM-DAC 295, and a Video Unit 200. The RAMDAC 295 converts the graphics data to an analogue video output. Finally, a Video Streams Unit 270 provides an interface to a digital video input and output system.

Figure 3:
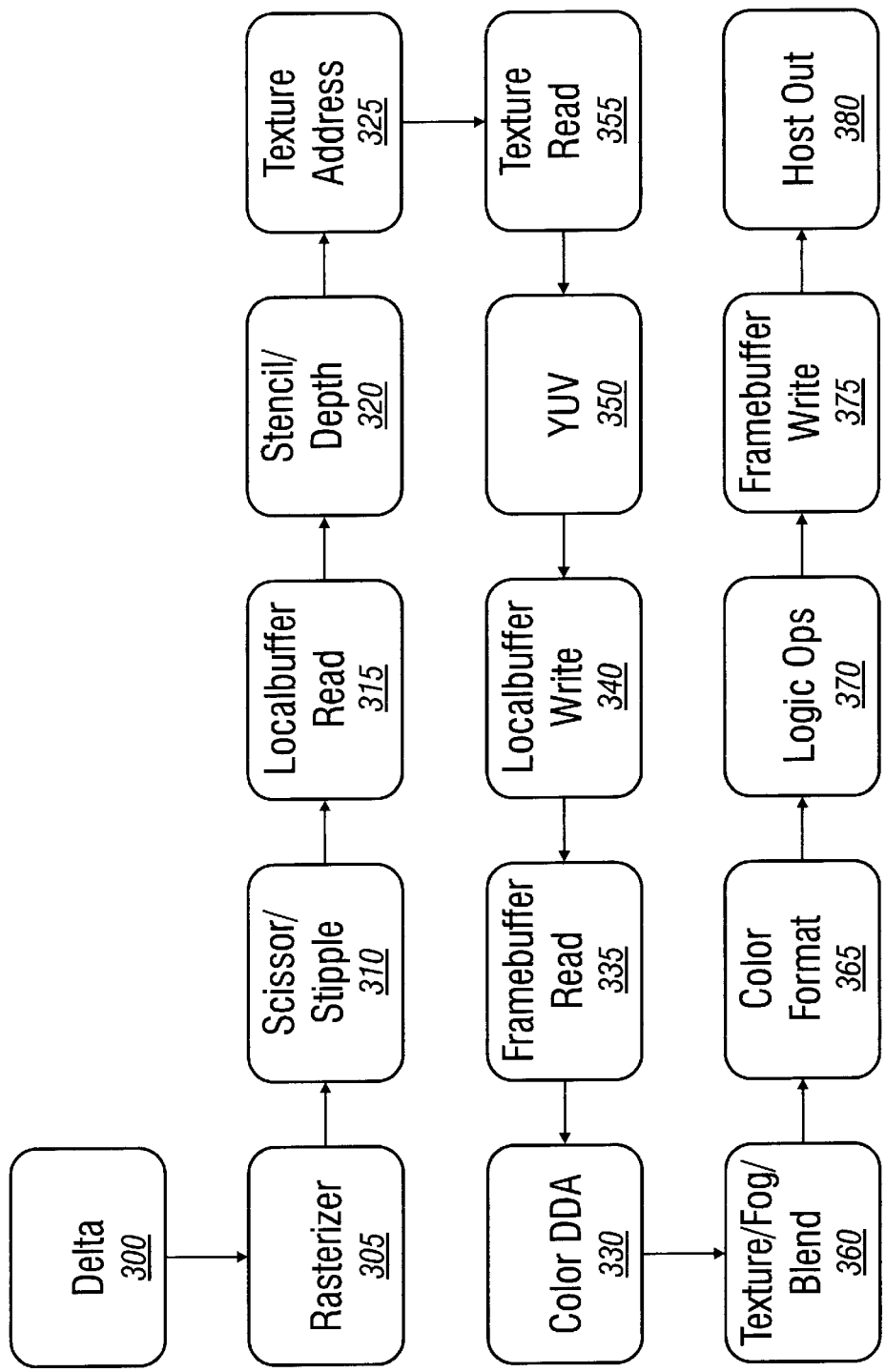
FIG. 3 shows a block diagram of the hyperpipeline of the preferred system.

A block diagram of the hyperpipeline of the PERMEDIA 2 processor is show in FIG. 3. The Graphics Hyperpipeline, or Graphics Processor, supports:

Point, Line, Triangle and Bitmap primitives Rectangle after Triangle

Flat and Gouraud shading

Texture Mapping, Fog and Alpha blending

Scissor and Stipple

Stencil test, Depth (Z) buffer test

Dithering

Logical Operations

The units in the HyperPipeline are:

Delta Unit 300 calculates parameters.

Rasterizer 305 scan converts the primitive into a series of fragments.

Scissor/Stipple 310 tests fragments against a scissor rectangle and a stipple pattern.

Localbuffer Read 315 loads localbuffer data for use in the Stencil/Depth unit.

Stencil/Depth 320 performs stencil and depth tests.

Texture Address 325 generates addresses of texels for use in the Texture Read unit.

Texture Read 355 accesses texture values for use in the texture application unit.

YUV unit 250 converts YUV data to RGB and applies chroma test.

Localbuffer Write 240 stores localbuffer data to memory.

Framebuffer Read 335 loads data from the framebuffer.

Color DDA 330 generates color information.

Texture/Fog/Blend 360 modifies color.

Color Format 365 converts the color to the external format.

Logic Ops 370 performs logical operations.

Framebuffer Write 375 stores the color to memory.

Host Out 380 returns data to the host.

The preferred embodiments performs the innovative process in two units of the graphics pipeline. The first color test, the mapping of the alpha value, and the filtering is done in the texture read unit 355. The final test of the alpha value and the rejection of the pixel is done in the YUV unit 350. The YUV unit also performs the function of converting, if necessary, data received in the YUV format to the internal RGBA format. YUV is an alternate color coding system in the computer graphics industry.

Alpha mapping performs a color key test before bilinear filtering, and prevents any of the red, green, or blue, components of a rejected pixel taking part in the filtering. The alpha channel is treated differently, and if a pixel fails the color test its alpha value is set to zero, but if it passes it is left at the original value. The alpha channel of all pixels, whether rejected or accepted, are filtered. This results in an alpha value of zero where all contributing pixels are rejected, an alpha value of one where all contributing pixels are accepted, and a varying alpha value where some are rejected and some accepted. As the magnification factor of the bilinear zoom is increased the variable alpha is spread across more destination pixels. The range of alpha values rejected by the chroma key test in the YUV unit can be adjusted to allow fine control over the exact size of the cut-out. If blending is enabled then the varying alpha values smooth the transition of the edge of the sprite to the background.

The registers AlphaMapUpperBound and AlphaMapLowerBound of the preferred system are used to control the range over which the test is done. These registers are each 32-bit RGBA registers, and are defined below.

AlphaMapLowerBound
    Name:        Alpha Map Color Test Lower and Upper Bounds
    Unit:         Texture| Read
    Region:      0 Offset: 0x0000.8F20
    Tag:         0x01E4
    Reset Value:  Undefined
    Read/write
    Specifies the lower and upper bounds for the alpha map test.
AlphaMapUpperBound
    Name:        Alpha Map Color Test Lower and Upper Bounds
    Unit:         Texture| Read
    Region:      0 Offset: 0x0000.8F18
    Tag:         0x01E3
    Reset Value:  Undefined
    Read/write
    Specifies the lower and upper bounds for the alpha map test Sprite Control The registers AlphaMapUpperBound and AlphaMapLowerBound define the range of colors that should have their alpha value mapped to zero. Texels that have failed the alpha map test are not included in filtering, so edge effects often seen with filtered cut-outs are removed.

The alpha values of the edge pixels are filtered so that they form a range from one within the area to be drawn to zero within the area not to be drawn. In the region close to the edge of what is to be drawn, the alpha values are filtered to lie between zero and one. The range of alpha values rejected by the key test can be adjusted to allow fine control over the exact size of the cut-out. If blending is enabled then the varying alpha values smooth the transition of the edge of the sprite to the background.

Alpha Blending

If the alpha value used for blending is derived exclusively from a texture map, the FBReadMode register can be set to disable reading of the framebuffer for any pixels for which the corresponding texel has an alpha value of one. If the alpha value is one, the final color will not include any of the previous framebuffer color so it does not need to be read.

AlphaBlendMode register allows control over the way that framebuffer data is mapped to the internal color format. This can prevent visual artifacts when blending with a dithered framebuffer.

```
AlphaBlendMode
    Name:           Alpha Blend Mode
    Unit:           Texture/Fog/Blend
    Region: 0       Offset: 0x0000.8810
    Tag: 0x0102
    Reset Value:    Undefined
    Read/write
    Controls Alpha Blending.
        Bit0 Enable:
            0 = Disable
            1 = Enable alpha blending or color formatting
        Bit1–7     Operation:
        Bit17      0 = Scale
                   1 = Shift
        Bit18      0 = Scale
                   1 = Shift
        Bit8–11    Color Format:
                   Internal Color Channel
```

According to a disclosed class of innovative embodiments, there is provided a method for rendering, comprising the steps of testing each pixel in a set of pixels to determine if each said pixel is part of an object to be displayed; changing at least one bit of each of said pixel to indicate the result of said testing step for that pixel; performing a filtering operation on each pixel according to said result; removing at least some of said pixels from said set of pixels according to the result of said filtering operation; blending said set of pixels with an image data.

According to another disclosed class of innovative embodiments, there is provided a method for rendering, comprising the steps of testing each pixel in a set of pixels to determine if each said pixel is part of an object to be displayed; changing an alpha value of said pixel to indicate the result of said testing step for that pixel; performing a filtering operation on each pixel according to said result, wherein said alpha value of all pixels are filtered, but other color data of only some of said pixels are filtered; removing at least some of said pixels from said set of pixels according to the result of said filtering operation; blending said set of pixels with an image data.

According to another disclosed class of innovative embodiments, there is provided a rendering system, comprising circuitry to test color data of each of a set of pixels to determine if said color data equals a key value; circuitry to set an alpha value of each of said pixels to zero if said color data equals said key value; circuitry to filter the color data of each pixel with an alpha value which is greater than zero; and circuitry to blend at least some of said pixels with data in a graphics memory.

According to another disclosed class of innovative embodiments, there is provided a pipelined graphics system, comprising a texture read unit connected to test color data of each of a set of pixels to determine if said color data equals a key value, set an alpha value of each of said pixels to zero if said color data equals said key value, and filter the color data of each pixel with an alpha value which is greater than zero; and a blend unit operatively connected to said texture read unit to blend at least some of said pixels with data in a graphics memory.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

A vast amount of engineering effort has been invested in computer graphics systems and techniques, and this area is one of increasing activity and demands. Numerous books have discussed the requirements of this area, and will therefore provide details of modifications and variations on the claimed embodiments, as known to those of ordinary skill in the art; see, e.g., ADVANCES IN COMPUTER GRAPHICS (ed. Enderle 1990-); Chellappa and Sawchuk, DIGITAL IMAGE PROCESSING AND ANALYSIS (1985); COMPUTER GRAPHICS HARDWARE (ed. Reghbati and Lee 1988); COMPUTER GRAPHICS: IMAGE SYNTHESIS (ed. Joy et al.); Foley et al., FUNDAMENTALS OF INTERACTIVE COMPUTER GRAPHICS (2.ed. 1984); Foley, COMPUTER GRAPHICS PRINCIPLES & PRACTICE (2.ed. 1990); Foley, INTRODUCTION TO COMPUTER GRAPHICS (1994); Giloi, Interactive Computer Graphics (1978); Hearn and Baker, COMPUTER GRAPHICS (2.ed. 1994); Hill, COMPUTER GRAPHICS (1990); Latham, DICTIONARY OF COMPUTER GRAPHICS (1991); Magnenat-Thalma, IMAGE SYNTHESIS THEORY & PRACTICE (1988); Newman and Sproull, PRINCIPLES OF INTERACTIVE COMPUTER GRAPHICS (2.ed. 1979); PICTURE ENGINEERING (ed. Fu and Kunii 1982); PICTURE PROCESSING & DIGITAL FILTERING (2.ed. Huang 1979); Prosise, How COMPUTER GRAPHICS WORK (1994); Rimmer, BIT MAPPED GRAPHICS (2.ed. 1993); Salmon, COMPUTER GRAPHICS SYSTEMS & CONCEPTS (1987); Schachter, COMPUTER IMAGE GENERATION (1990); Watt, THREE-DIMENSIONAL COMPUTER GRAPHICS (2.ed. 1994); Scott Whitman, MULTIPROCESSOR METHODS FOR COMPUTER GRAPHICS RENDERING; the SIGGRAPH PROCEEDINGS for the years 1980–1994; and the *IEEE Computer Graphics and Applications* magazine for the years 1990–to date; all of which are hereby incorporated by reference.

A sample detailed implementation of a pipelined architecture is shown in U.S. Pat. No. 5,594,854, which is hereby incorporated by reference. However the innovative teachings of the present application are not limited to this architecture, nor indeed to pipelined architectures at all.

What is claimed is:

1. A method for rendering, comprising the steps of:
    testing each pixel in a set of pixels to determine if each said pixel is part of an object to be displayed;
    changing at least one bit of each of said pixel to indicate the result of said testing step for that pixel;
    performing a filtering operation on each pixel according to said result;
    removing at least some of said pixels from said set of pixels according to the result of said filtering operation;
    blending said set of pixels with an image data;
    wherein said changing step includes setting an alpha value of each pixel that fails said testing step to zero.

2. The method of claim 1, wherein said removing step includes removing any pixels with an alpha value of less than 0.5.

3. The method of claim 1, wherein said set of pixels is a texture map.

4. The method of claim 1, further comprising, before said blending step, the step of magnifying said set of pixels.

5. The method of claim 1, wherein said testing step includes determining if a color data if each of said pixels is the same as a key color.

6. The method of claim 1, wherein said filtering step is a bilinear filter.

7. A method for rendering, comprising the steps of:

testing each pixel in a set of pixels to determine if each said pixel is part of an object to be displayed;

changing an alpha value of said pixel to indicate the result of said testing step for that pixel;

performing a filtering operation on each pixel according to said result, wherein said alpha value of all pixels are filtered, but other color data of only some of said pixels are filtered;

removing at least some of said pixels from said set of pixels according to the result of said filtering operation;

blending said set of pixels with an image data.

8. The method of claim 7, wherein said removing step includes removing any pixels with an alpha value of less than 0.5.

9. The method of claim 7, wherein said set of pixels is a texture map.

10. The method of claim 7, further comprising, before said blending step, the step of magnifying said set of pixels.

11. The method of claim 7, wherein said testing step includes determining if a color data if each of said pixels is the same as a key color.

12. The method of claim 7, wherein said changing step includes setting an alpha value of each pixel that fails said testing step to zero.

13. The method of claim 7, wherein said filtering step is a bilinear filter.

14. A rendering system, comprising:

circuitry to test color data of each of a set of pixels to determine if said color data equals a key value;

circuitry to set an alpha value of each of said pixels to zero if said color data equals said key value;

circuitry to filter the color data of each pixel with an alpha value which is greater than zero; and circuitry to blend at least some of said pixels with data in a graphics memory.

15. The rendering system of claim 14, wherein only pixels with an alpha value of less than 1.0 are blended.

16. The rendering system of claim 14, wherein said set of pixels is a texture map.

17. A pipelined graphics system, comprising:

a texture read unit connected to test color data of each of a set of pixels to determine if said color data equals a key value, set an alpha value of each of said pixels to zero if said color data equals said key value, and filter the color data of each pixel with an alpha value which is greater than zero; and a blend unit operatively connected to said texture read unit to blend at least some of said pixels with data in a graphics memory.

18. The pipelined graphics system of claim 17, wherein only pixels with an alpha value of less than 1.0 are blended.

19. The pipelined graphics rendering system of claim 17, wherein said set of pixels is a texture map.

* * * * *